US005502425A

United States Patent [19]

Tsai

[11] Patent Number: 5,502,425
[45] Date of Patent: Mar. 26, 1996

[54] MAGNETIC ENERGY REINFORCING DEVICE

[76] Inventor: Tsung C. Tsai, No. 3, Hsing Hwa Lane, Hsing Hwa Li, Lu Kang Chen, Taiwan

[21] Appl. No.: 457,492

[22] Filed: Jun. 1, 1995

[51] Int. Cl.[6] .............................. H01F 7/02; B01D 35/06; B03C 1/02

[52] U.S. Cl. ............................ 335/304; 210/222; 335/306

[58] Field of Search ..................................... 335/301–306; 123/538; 210/222, 223

[56] References Cited

U.S. PATENT DOCUMENTS 5,129,382 7/1992 Stamps, Sr. et al. ................... 123/536

*Primary Examiner*—Leo P. Picard
*Assistant Examiner*—Raymond M. Barrera
*Attorney, Agent, or Firm*—Bacon & Thomas

[57] ABSTRACT

A magnetic energy reinforcing device including a base having an axial through hole and a plurality of chambers symmetrically spaced around said through hole, a plurality of magnets respectively mounted in each chamber on the base, and a plurality of antimagnetic plates mounted on the base and respectively disposed adjacent to the magnets at an outer side to concentrate the magnetic energy of the magnets into the axial through hole.

7 Claims, 4 Drawing Sheets

MAGNETIC ENERGY REINFORCING DEVICE

BACKGROUND OF THE INVENTION

The present invention relates to a magnetic energy reinforcing device which fully utilizes the magnetic energy of magnets.

FIG. 1 shows the magnetic flux distribution of a regular magnet. The magnetic flux density at the N pole is equal to that at the S pole. However, this property limits the application of the magnetic energy of the magnet.

SUMMARY OF THE INVENTION

The main object of the present invention is to provide a magnetic energy reinforcing device which changes the magnetic flux density of magnets between two opposite poles so as to effectively utilize the magnetic energy of the magnets. To achieve this object, there is provided a magnetic energy reinforcing device comprised of a base having an axial through hole and a plurality of chambers symmetrically spaced around said through hole, a plurality of magnets respectively mounted in each chamber on the base, and a plurality of antimagnetic plates mounted on the base and respectively disposed adjacent to the magnets at an outer side to concentrate the magnetic energy of the magnets into the axial through hole.

DETAILED DESCRIPTION OF THE PREFERRED EMBODIMENT

Figure 1:
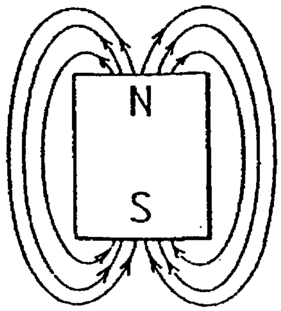
Fig. 1 PRIOR ART
FIG. 1 shows the magnetic flux distribution of a magnet.
Figure 2:
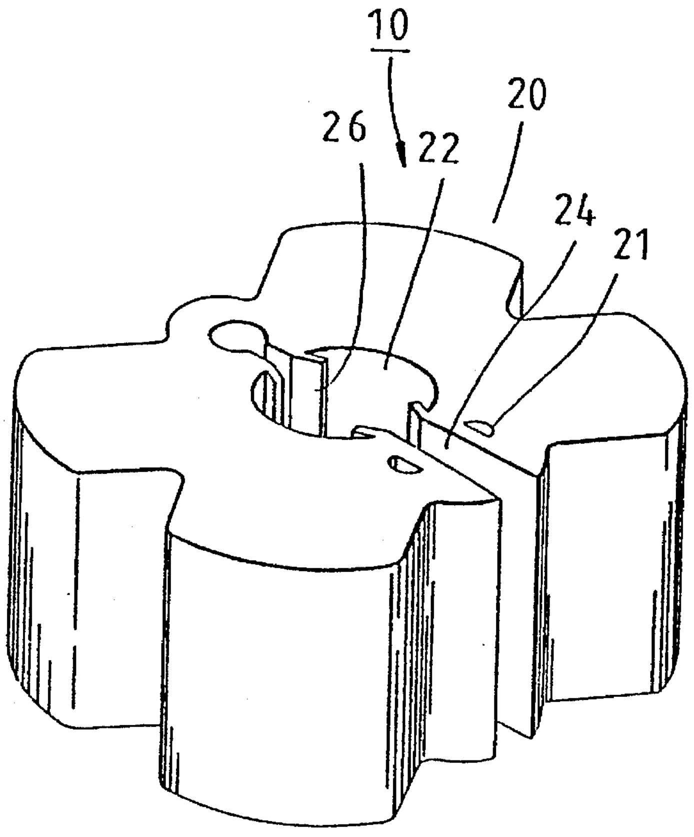
FIG. 2 is an elevational view of a magnetic energy reinforcing device according to the present invention.
Figure 3:
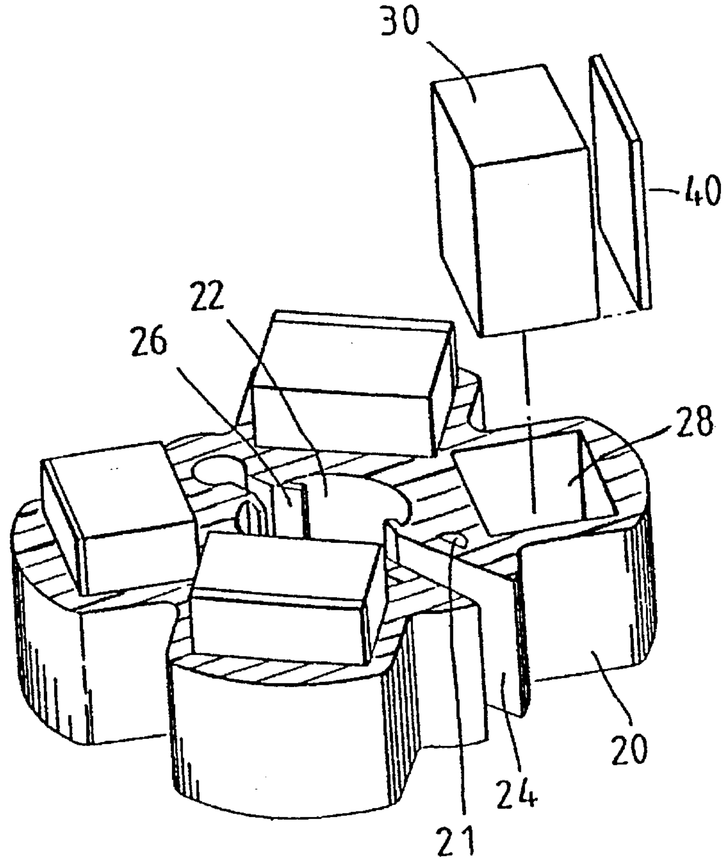
FIG. 3 is a cutaway and exploded view of the magnetic energy reinforcing device shown in FIG. 2.

Referring to FIGS. 2 and 3, the magnetic energy reinforcing device, referenced by 10, comprises a base 20, four magnets 30, and four antimagnetic plates 40. The base 20 is a solid split block having an axial through hole 22 through the top and bottom sides, a transverse split 24 extended from the border and across the through hole 22, two opposite pairs of inward flanges 26 respectively extended from two opposite sides of the transverse split 24 and projecting into the through hole 22, two symmetrical pairs of chambers 28 around the through hole 22, and two mounting holes 21 separated by the split 24. The four magnets 30 are respectively mounted within the chambers 28 on the base 20, permitting the through hole 22 to be covered within the magnetic lines of force of the magnets 30. The antimagnetic plates 40 are preferably made from zinc, or iron covered with zinc. They can also made from any suitable material which achieves the same effect. The antimagnetic plates 40 are mounted on the base 10 at an outer side corresponding to the magnets 30. Preferably, the antimagnetic plates 40 are respectively mounted in the chambers 28 and closely attached to each magnet 30 at an outer side.

Figure 5:
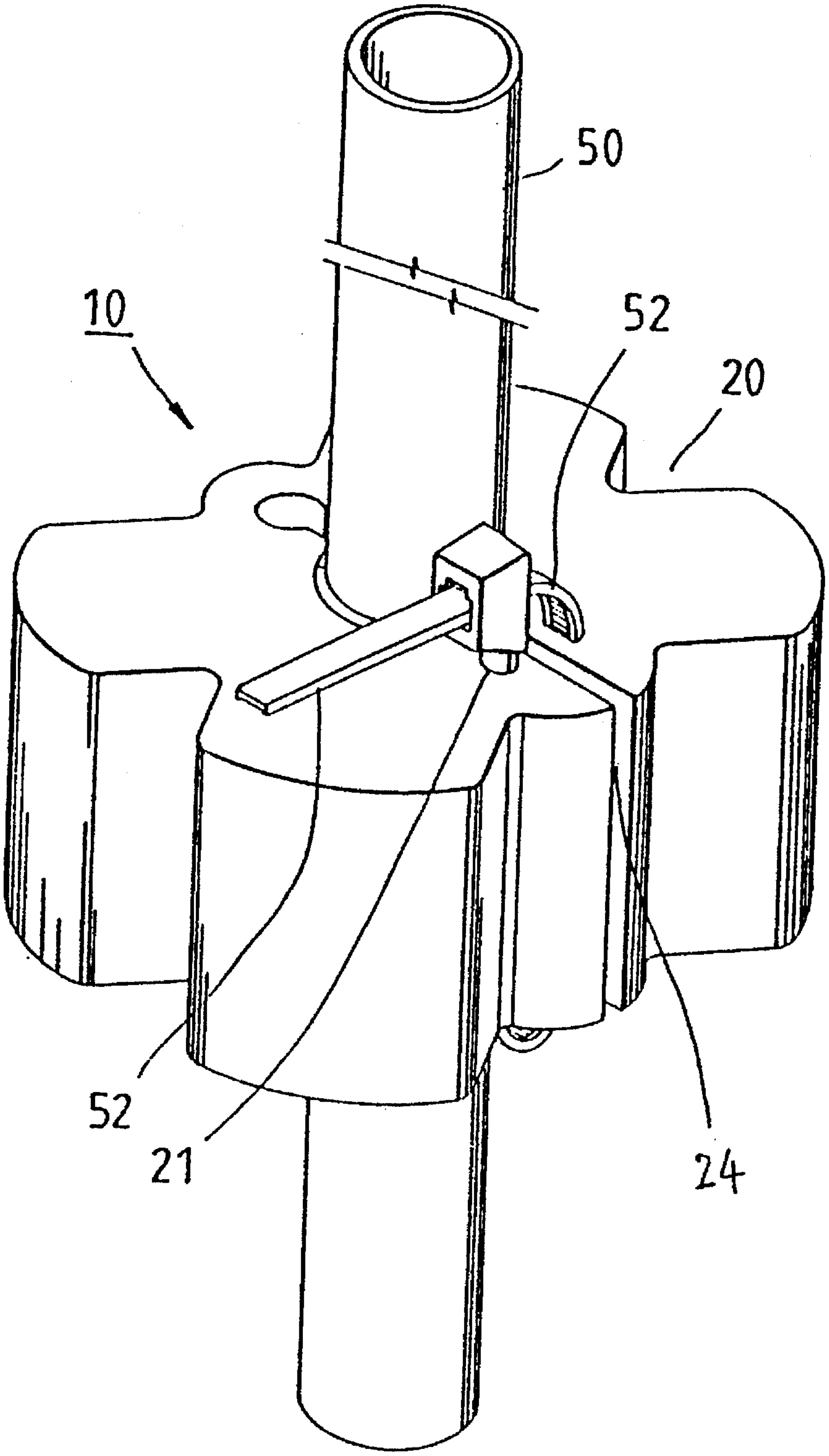
FIG. 5 is an applied view showing the magnetic energy reinforcing device of the present invention installed in an oil pipe.

Referring to FIG. 5, when in use, the base 20 can be mounted around an oil pipe 50 by fixed in place by fastening a tie 52 to the mounting holes 21 to close the split 24.

Figure 4:
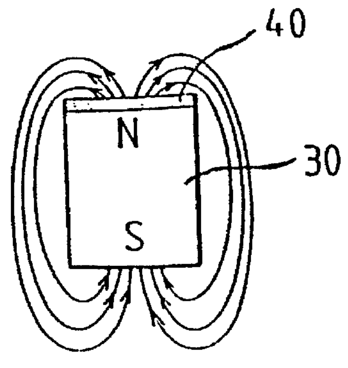
FIG. 4 shows the magnetic flux distribution of a magnet attached with an antimagnetic plate according to the present invention.

Referring to FIG. 4, when one antimagnetic plate 40 is attached to the N pole of one magnet 30, the magnetic flux density of the magnet 30 is changed. Assume that the magnetic energy of the magnet 30 is that the magnetic flux density of each pole is 1800–2000 Gauss and the length of magnetic energy of its magnetic line of force is 18–20 mm. When the antimagnetic plate 40 is closely attached to the N pole of the magnet 30, the magnetic flux density at the N pole is reduced to about 1000 Gauss, and the length of magnetic energy of the N pole is shortened to about 13 mm. Because of the law of conservation of energy, the magnetic flux density at the S pole is increased by about 100 Gauss, and the length of magnetic energy of the S pole is extended by about 6 mm.

As stated above, when the antimagnetic plates 40 are respectively attached to the magnets 30 at an outer side, the magnetic lines of force of the magnets 30 are changed, therefore the magnetic flux density as well as the length of magnetic energy at the N pole to which the respective antimagnetic plate 40 is attached, are relatively reduced, and the amount of energy which is reduced from the N pole is transferred to the S pole. Therefore, the non-effective outer part of the magnetic energy of the magnetic reinforcing device 10 is transferred to the inner inside of the magnetic reinforcing device 10 to act at the oil pipe 50 (see FIG. 5) so as to activate oil molecules. Because the amount of magnetic energy at the outer side of the magnetic energy reinforcing device 10 is relatively reduced, less impurities will be attracted by the periphery of the magnetic energy reinforcing device 10.

Figure 6:
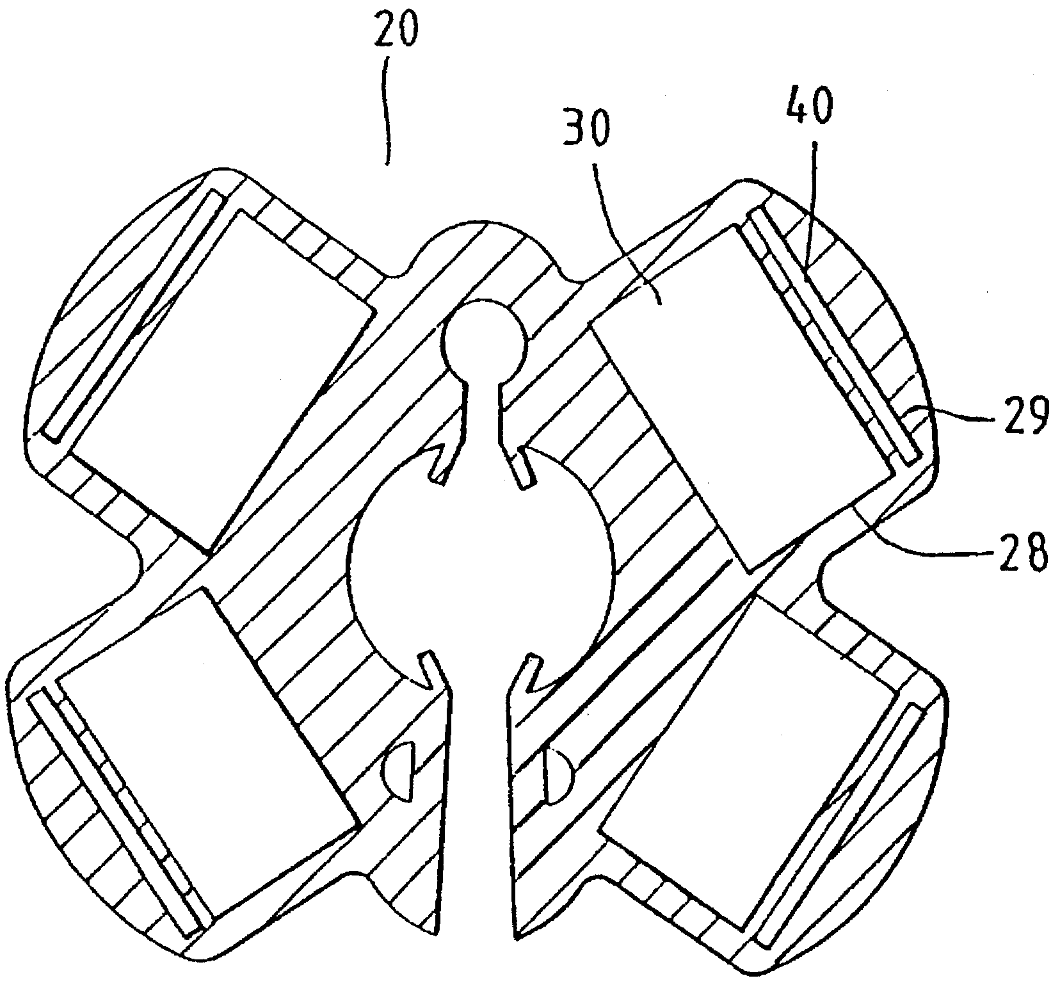
FIG. 6 is a cross sectional view of an alternate form of the present invention.

FIG. 6 shows an alternate form of the magnetic energy reinforcing device in which a plurality of slots 29 are respectively disposed at an outer side adjacent to each chamber 28 to receive the antimagnetic plates 40. This arrangement achieves the same effect as the embodiment of FIGS. from 2 to 5 does.

It is to be understood that the drawings are designed for purposes of illustration only, and are not intended as a definition of the limits and scope of the invention disclosed.

I claim:

1. A magnetic energy reinforcing device of the type comprising a base having an axial through hole, and a plurality of chambers symmetrically spaced around said through hole, and a plurality of magnets respectively mounted in each chamber on said base, wherein a plurality of antimagnetic plates are mounted on said base and respectively disposed adjacent to said magnets at an outer side to concentrate the magnetic energy of said magnets into said axial through hole.

2. The magnetic energy reinforcing device of claim 1 wherein said antimagnetic plates are respectively mounted in said chambers on said base and closely attached to each magnet at an outer side.

3. The magnetic energy reinforcing device of claim 1 wherein said base further comprises a plurality of slots respectively disposed at an outer side adjacent to each chamber for mounting said antimagnetic plates.

4. The magnetic energy reinforcing device of claim 1 wherein said antimagnetic plates are made from zinc.

5. The magnetic energy reinforcing device of claim 1 wherein said antimagnetic plates are covered with zinc.

6. The magnetic energy reinforcing device of claim 1 wherein said base further comprises a transverse split extended from the border and across said axial through hole, and two opposite pairs of inward flanges respectively extended from two opposite sides of said transverse split and projecting into said axial through hole.

7. The magnetic energy reinforcing device of claim 6 wherein said base further comprises a plurality of mounting portions adjacent to said split for fastening by fastening means to close up said split.

* * * * *